United States Patent [19]

Griefer

[11] Patent Number: 5,615,213
[45] Date of Patent: Mar. 25, 1997

[54] MESSAGE TRANSMISSION USING OUT-OF-BAND SIGNALING CHANNEL

[75] Inventor: Allan D. Griefer, San Jose, Calif.

[73] Assignee: International Business Machines Corporation, Armonk, N.Y.

[21] Appl. No.: 422,192

[22] Filed: Apr. 13, 1995

[51] Int. Cl.$^6$ .................................. H04J 3/02; H04J 3/16
[52] U.S. Cl. ......................... 370/412; 370/462; 370/468; 370/524
[58] Field of Search .............................. 370/110.1, 94.1, 370/85.7, 95.1, 85.6

[56] References Cited

U.S. PATENT DOCUMENTS

| | | | |
|---|---|---|---|
| 5,289,472 | 2/1994 | Cho | 370/110.1 |
| 5,490,251 | 2/1996 | Clark et al. | 395/200.2 |

FOREIGN PATENT DOCUMENTS

| | | | |
|---|---|---|---|
| 9408411 | 4/1994 | Finland | 370/85.6 |

OTHER PUBLICATIONS

Simpson, W., "PPP over ISDN", Internet Request for Comments (RFC) 1618, May 1994.

Simpson, W., "The Point-to-Point Protocol (PPP)", RFC 1548, Dec. 1993.

Ascend Communications, Inc., "Multiband MAX–T1/PRI, User documentation", pp. 2–6, 2–7 and 2–8, Jun. 1994.

Malis, A. et al., "Multiprotocol Interconnect on X.25 and ISDN in the Packet Mode", RFC 1618, Aug. 1992.

*Primary Examiner*—Douglas W. Olms
*Assistant Examiner*—Abdelhamid Bnimoussa
*Attorney, Agent, or Firm*—Baker, Maxham, Jester & Meador

[57] ABSTRACT

In a communication network having multiple transmission channels, digital data comprising messages sufficiently short to be treated as packet messages are not sent over the network channels ordinarily used for message transmission, but instead are sent over network channels typically used for out-of-band signaling. Each data message is prepared and its length is checked for suitability as a message packet. If the data message can be packaged as a message packet, it is sent over the flat rate network channel. If the message cannot be packaged as a message packet, then it is sent according to conventional message transmission techniques for the network. The channel selection scheme can be implemented in a system that utilizes the Integrated Services Data Network (ISDN), such that data messages are checked to determine if they can be sent over the ISDN D channel rather than over the more conventionally used ISDN B channel.

12 Claims, 3 Drawing Sheets

MESSAGE TRANSMISSION USING OUT-OF-BAND SIGNALING CHANNEL

BACKGROUND OF THE INVENTION

1. Field of the Invention

This invention relates generally to message transmission over networks and, more particularly, to message transmission over networks that include multiple data channels for transmitting different types of messages.

2. Description of the Related Art

Many data networks over which messages are transmitted include multiple data transmission channels. Each channel is assigned a frequency band over which messages can be transmitted. Typically, each channel carries a particular type of message so that network control signals can be transmitted separately from message traffic. That is, unlike conventional telephone line connections, network control messages that typically are very short are not transmitted within the bandwidth used for actual message traffic. Rather, network control messages (such as connect messages and identification data) can be sent over lines tailored for that function and data messages likewise can be sent over lines tailored for that function. Keeping the message traffic separated permits maximum efficiency of the available bandwidth and network resources.

For example, the Integrated Services Digital Network (ISDN) is a network of high-speed communication lines that carry messages defined by an internationally recognized message transmitting protocol having standardized channels that permit both analog voice data (such as produced by conventional telephone systems) and digital data to be transmitted over the network. The six ISDN channels defined so far include the A channel (a 4 KHz bandwidth analog telephone channel intended for voice transmission), the B channel (a 64 kilobits per second (kbps) data channel for voice data or digital data), the C channel (an 8 kbps or 16 kbps digital channel), the D channel (a 16- or 64 kbps digital channel used for out-of-band signaling), the E channel (a 64 kbps digital channel for internal network signaling), and the H channel (a 384 kbps, 1536 kbps, or 1920 kbps digital channel).

As noted above, different network channels typically are used for different purposes, and therefore the channels typically have different message traffic utilization rates and carry user messages of different lengths. For example, the ISDN A channel is primarily used for conventional analog telephone traffic and therefore can be used relatively frequently, with rather long connect times between users. The ISDN B channel is used for most digital message traffic and can have a wide range of utilization rates, connect times, and message lengths. The ISDN D channel is used primarily for sending message packets for network control and out-of-band signaling and therefore typically carries very short messages with minimal connect times.

Calls over the ISDN network are initiated by a user, referred to as the local side, comprising a local communication device connected to an ISDN adapter device. The call is sent over the ISDN channels to another user, referred to as the remote side, comprising a remote communication device connected to an ISDN adapter device. For example, the ISDN D channel might be used initially to set up the call and establish communication via an exchange of message packets between the local user and the remote user, and then the actual message might be transmitted over the ISDN B channel.

As a result of the different typical connect times, utilization rates, and message lengths, providers of the communications lines over which the user messages are sent typically charge for use of the different network channels at different rates. For example, ISDN A channel and B channel calls are typically charged for each use, according to the time during which there is an actual connection, at the standard business telephone line call rate for a voice call. A typical rate structure is referred to as measured rate and might be, for example, US$0.04 for the first minute of connect time for a call and US$0.01 for each minute of the same call thereafter. ISDN D channel calls are typically charged at a flat rate for access, such as US$4.00 per month.

Various schemes are frequently used to reduce the amount of time during which a call is connected, and therefore reduce the charge that is incurred for use of a line. For example, ISDN adapter devices typically initiate a call on the first B channel frequency, or line, that is available. The line is disconnected, also referred to as "dropped", if the line is idle (meaning there is no message traffic) after a user-specified number of minutes. The number of idle minutes to tolerate before dropping the line depends on the local rate structure that a user confronts. At a particular expected number of idle minutes before the next message transmission or reception, it is more cost effective to drop the line and incur the higher per-minute charge for the initial connect time upon the next need for the line, rather than to remain connected (and accumulate the lower rate line-connect time charge) while waiting for the next message transmission or reception. The adapter devices can be adapted to implement channel selection and hang-up decisions based on the particular line rate structure faced by a particular user at a particular location.

More sophisticated channel selection schemes also are used. For example, some ISDN adapter devices will initiate a call on a second B channel if the data rate on the first B channel exceeds a user-specified threshold value. Selecting the second channel can reduce the charge incurred by balancing the data rate across two channels. The second channel also can be dropped if it is idle after a user-specified number of minutes. Such channel-dropping schemes, however, often run afoul of adapter devices and transmission protocols that require that lines not be dropped to keep both ends of a network connection informed of the channel status. To ensure that lines not be dropped, for example, some adapter devices broadcast what are known as "keep-alive" messages that transmit a default dummy message before a hang-up scheme can drop a line, thereby keeping a connection even if there is no legitimate message traffic on a channel. The keep-alive messages might be sent, for example, every seventy-five seconds or every few minutes. Using keep-alive messages permits the connection status to always be known to users at both ends of a network connection. In practical use, the keep-alive messages mean that some channels are never dropped, so that the line remains connected virtually all the time. Thus, maintaining status information at both ends of a channel can result in relatively high connection charges.

To avoid continuous connections due to keep-alive messages, some adapter devices are designed to receive keep-alive message and respond as if they were the remote device itself. This practice is referred to as spoofing and permits the remote user to appear as if still connected to the local user without incurring the connect charge. Unfortunately, the local user cannot really determine if the remote user is still functional and therefore a transmission problem with the channel might occur without the knowledge of the local user.

Without knowledge of the true line connection status, messages can be lost. Lost messages due to spoofing can easily overwhelm the cost savings otherwise obtained by reducing the line connect time.

From the discussion above, it should be apparent that there is a need for a system that supports message transmission over networks that include multiple data channels for transmitting different types of messages and does so without incurring significant connect time charges or ignoring line status, thereby permitting more cost effective use of the network. The present invention satisfies this need.

SUMMARY OF THE INVENTION

In accordance with the invention, digital data comprising messages sufficiently short to be treated as packet messages are not sent over the network channels ordinarily used for message transmission, but instead are sent over network channels typically used for out-of-band signaling. The data message is prepared and its length is checked for suitability as a message packet. If the data message can be packaged as a message packet, it is sent over the flat rate network channel. If the message cannot be packaged as a message packet, then it is sent according to conventional message transmission techniques for the network. Thus, suitable messages can be sent over network channels that are charged for use according to a flat access charge rather than over network channels that are charged according to the actual connect time. In this way, maximum use is made of the cheaper rate structure for out-of-band signaling lines and the cost of sending and receiving messages over the network is reduced.

In one aspect of the invention, in a system that utilizes the Integrated Services Data Network (ISDN), messages are checked to determine if they can be sent over the ISDN channel D rather than over the more conventionally used ISDN channel B. In particular, short messages are packetized for transmission using the packet protocol of the ISDN D channel rather than using the connection protocol of the ISDN B channel. The message length limits that determine when the B channel will be used and when the D channel will be used can be set by an end user. Having the limits set by the end user provides the flexibility to respond to local rate structures and changing conditions.

Other features and advantages of the present invention should be apparent from the following description of the preferred embodiment, which illustrates, by way of example, the principles of the invention.

DESCRIPTION OF THE PREFERRED EMBODIMENT

Figure 1:
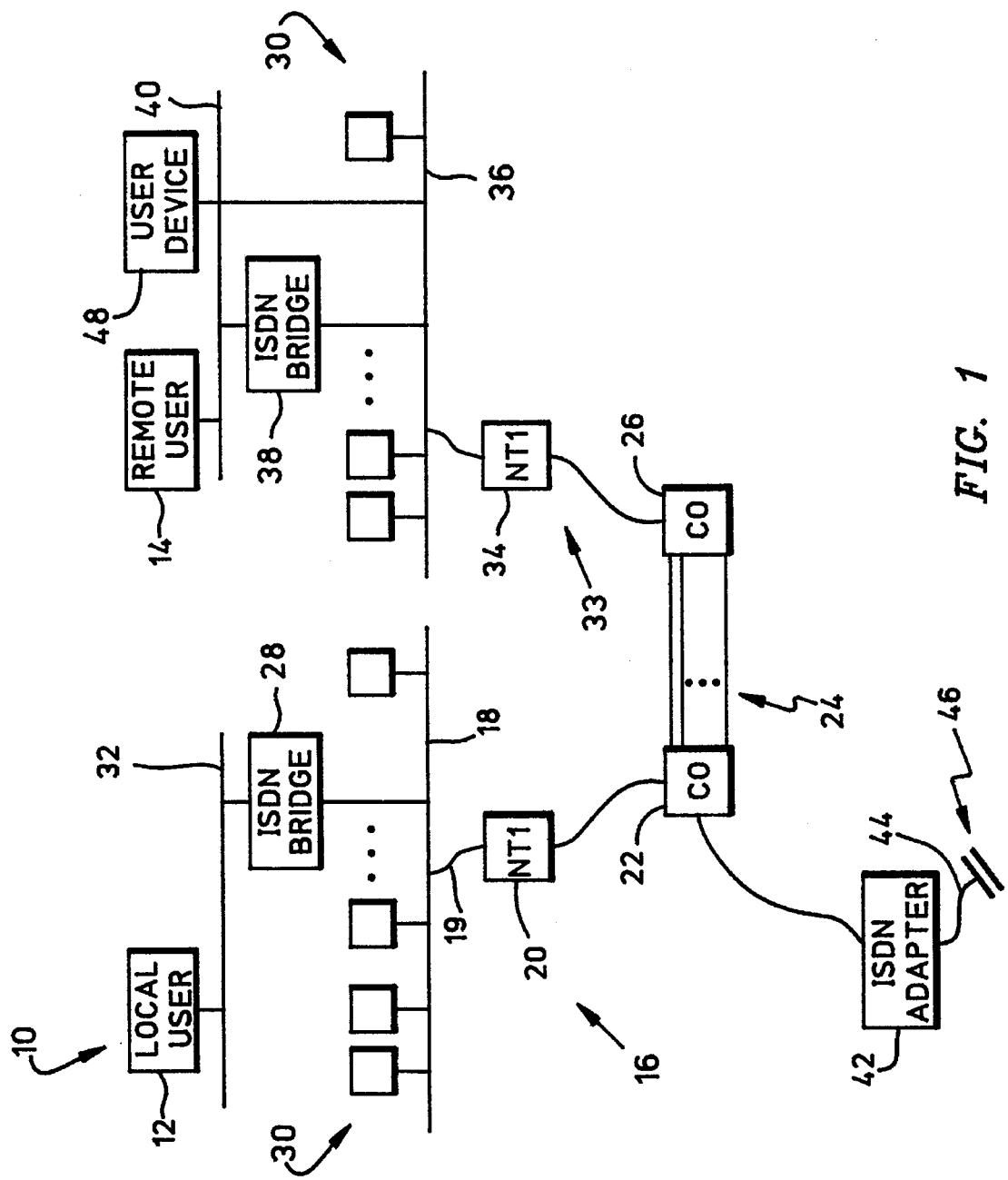
FIG. 1 is a block diagram of a communication network constructed in accordance with the present invention.

FIG. 1 shows a communication network 10, constructed in accordance with the present invention, in which a local user device 12 communicates with a remote user device 14 so that the devices can send and receive data messages. At the local site 16 where the local user 12 initiates communication, a local site network bus 18 is connected via data lines 19 to an interface adapter device 20 that is connected to a telephone utility company Central Office (CO) 22. The CO associated with the local user device communicates over integrated voice and digital, high-speed communication lines 24 with a corresponding Central Office 26 of the remote user device such that control data is generally sent over dedicated lines for out-of-band signaling. In the preferred embodiment, the high-speed lines 24 are of the configuration specified by the Integrated Services Digital Network (ISDN). Thus, the high-speed lines 24 include the ISDN A channel, B channel, and D channel, among others. In accordance with the invention, a network bridge 28 of the local site determines which one of the available high-speed lines 24 will be used for transmission of a data message. The network bridge makes the selection such that the D channel, with its flat access rate charge, is selected for data messages that are sufficiently short to be sent as message packets. The network bridge sends longer messages over other communication lines, such as the more costly B channel. In this way, the cost of transmitting messages over the ISDN lines is reduced from the cost that otherwise would be incurred using conventional message transmission over the B channel alone.

At the local site 16, the interface adapter device 20, in the ISDN context, is commonly referred to as an "NT1" device. The NT1 device is connected to the local user bus 18, which can accommodate up to eight user devices 30, in accordance with the ISDN standard. In the United States (U.S.A.), the NT1 device typically is the property of the local site owner and is located at the local site 16. In most other parts of the world, the NT1 device typically is the property of the telephone utility company. The network bridge 28 comprises one of the eight user devices and is more typically referred to as an ISDN bridge. The ISDN bridge includes a local bus adapter that permits communication with the local user bus 18 and also includes a local network adapter that permits communication with a local area network 32. As described further below, these adapters can be implemented by a processor that performs predetermined operational steps. Through the local area network, the ISDN bridge can communicate with local user devices connected to the local area network. The local area network 32 can comprise, for example, an "Ethernet" network or a token ring network. The local area network can support multiple users, only one user 12 being illustrated in FIG. 1 for simplicity.

The remote user device 14 is located at a remote site 33 having a configuration that typically is similar to that of the local site 16. Thus, the Central Office (CO) 26 associated with the remote user 14 is connected to an NT1 device 34 that in turn is connected to a remote user bus 36. The remote user bus can support up to eight devices 30, one of which can be an ISDN bridge 38 that is connected to a network 40, to which the remote user device 14 is connected. The remote user ISDN bridge 38 may or may not incorporate the features of the invention. To derive the benefits of the invention, however, an ISDN bridge must incorporate the outgoing message channel selection features described for the ISDN bridge 28 constructed in accordance with the invention. An additional ISDN interface adapter device 42 is illustrated in FIG. 1 to emphasize that many adapter devices may be connected to a single Central Office. It is to be understood that the interface adapter device is connected by data lines 44 to one or more network buses 46 that in turn are connected to user devices.

The function of the ISDN bridge 28 can be performed, if desired, by a processor that is incorporated into a user device. Alternatively, the ISDN bridge can comprise a separate component connected to the respective local or remote user bus. In either case, the ISDN bridge processor can incorporate the local bus adapter and local network adapter described above. For example, FIG. 1 shows a user device 48 that includes processing elements that incorporate the functional elements of the ISDN bridge 28. Thus, the user device 48 can produce messages and communicate over the high-speed lines 24 without need for a separate ISDN bridge and ISDN bridge interface connection to the remote user bus 36.

Figure 2:
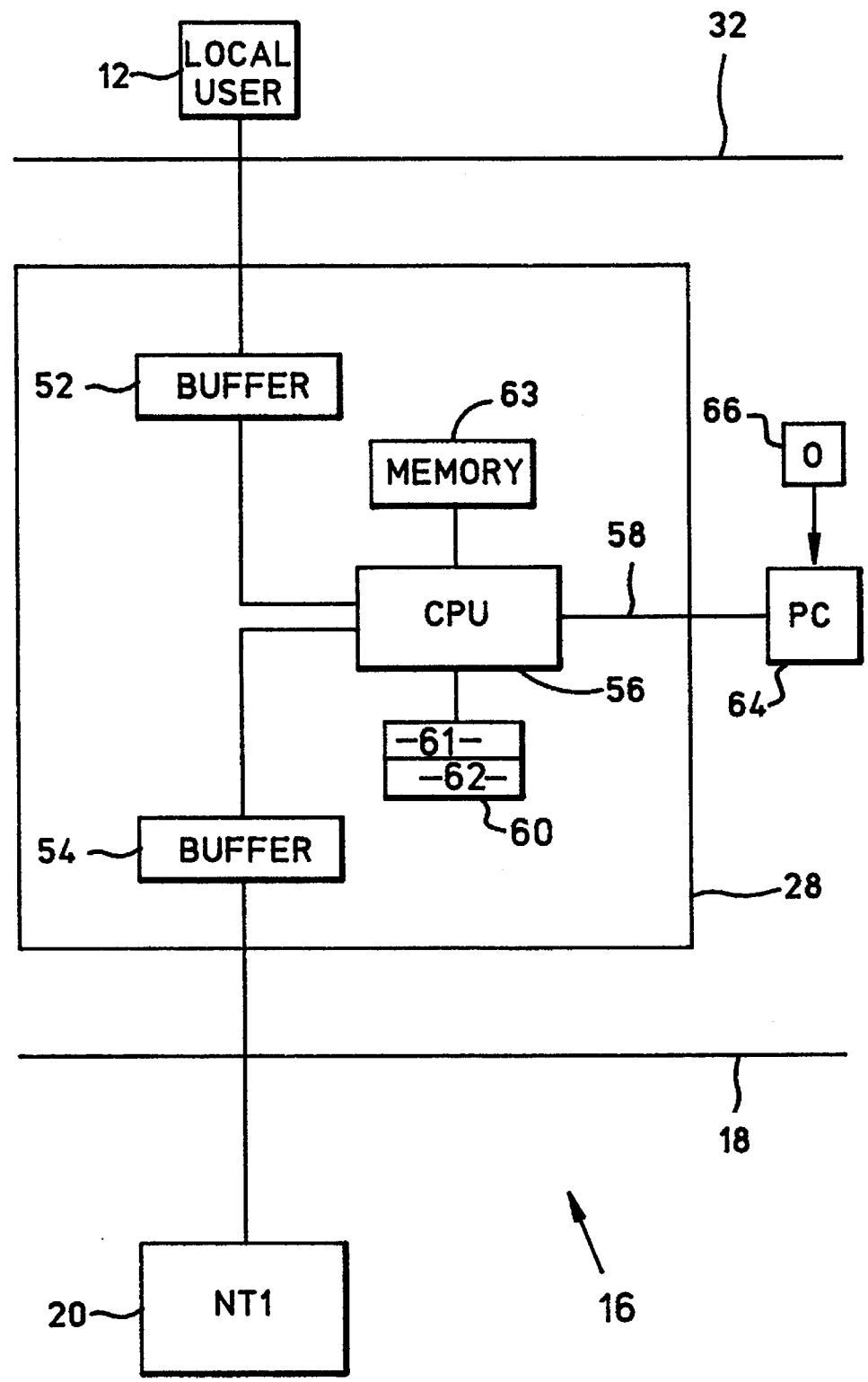
FIG. 2 is a block diagram of an adapter device illustrated in FIG. 1.

A better understanding of the ISDN bridge 28 configuration of the preferred embodiment will be gained with reference to FIG. 2, which shows a block diagram of the ISDN bridge 28. As illustrated therein, the ISDN bridge includes a user device buffer 52 that provides temporary storage for data at the local user device/ISDN bridge interface. The user device buffer provides temporary data storage that permits data traffic volume and transmission speed balancing between the local user device, local area network, and ISDN bridge. The ISDN bridge also includes an adapter device buffer 54 that provides temporary storage of data at the ISDN bridge/adapter device interface. The adapter device buffer performs a function analogous to the user device buffer in that the adapter device buffer permits balancing between data from the ISDN bridge and the local site bus 18. Data is stored into and retrieved from the respective buffers 52, 54 under control of an ISDN bridge central processor unit 56 to achieve the desired balancing so as to reduce the likelihood of losing data during transmission.

The central processor unit 56 can comprise a variety of microprocessors that will readily occur to those skilled in the art, including, for example, the "68030" microprocessor produced by the Motorola Corporation. Alternatively, the ISDN bridge central processor unit 56 can comprise a less powerful processor that is connected via an industry standard RS-232 specification data line 58 to a secondary processor or computer, such as a "Personal Computer" computer device available from the International Business Machines Corporation (IBM Corporation), or a Personal Computer-compatible (PC-compatible) computer device having an appropriate central processor unit.

The ISDN bridge 28 also includes a memory unit 60 that incorporates program memory 61 in which is stored processing instructions that, when executed, cause the central processor unit 56 to perform the operational steps described further below. The memory unit also includes a send queue 62 in which the central processor unit stores messages for transmission over the high-speed lines 24. The ISDN bridge optionally includes a protected memory unit 63 in which, for example, a user password can be stored to provide for data security. Typically, the user password is stored in the protected memory unit by authorized administrative persons but cannot be viewed or changed by an end user. If an end user provides a password that does not match the password stored in the protected memory unit 63, then the central processor unit will not permit further operation of the user device.

As noted above, the central processor unit 56 of the ISDN bridge 28 carries out program steps that are stored in the memory unit 60 as instructions. The program steps, as well as other operating parameters comprising program data, can be loaded into the memory unit through the RS-232 line 58. More particularly, the program steps can be stored on a program storage device having digital storage media, such as a floppy disk 64, and can be transferred from the program storage device into the memory unit by an external computer device 66. The external computer device can be a "Personal Computer" device available from the IBM Corporation or a PC-compatible device. The external computer device can set operating parameters that control execution of the program steps, such as the message size limits that control switching between the ISDN D channel and the ISDN B channels.

Figure 3:
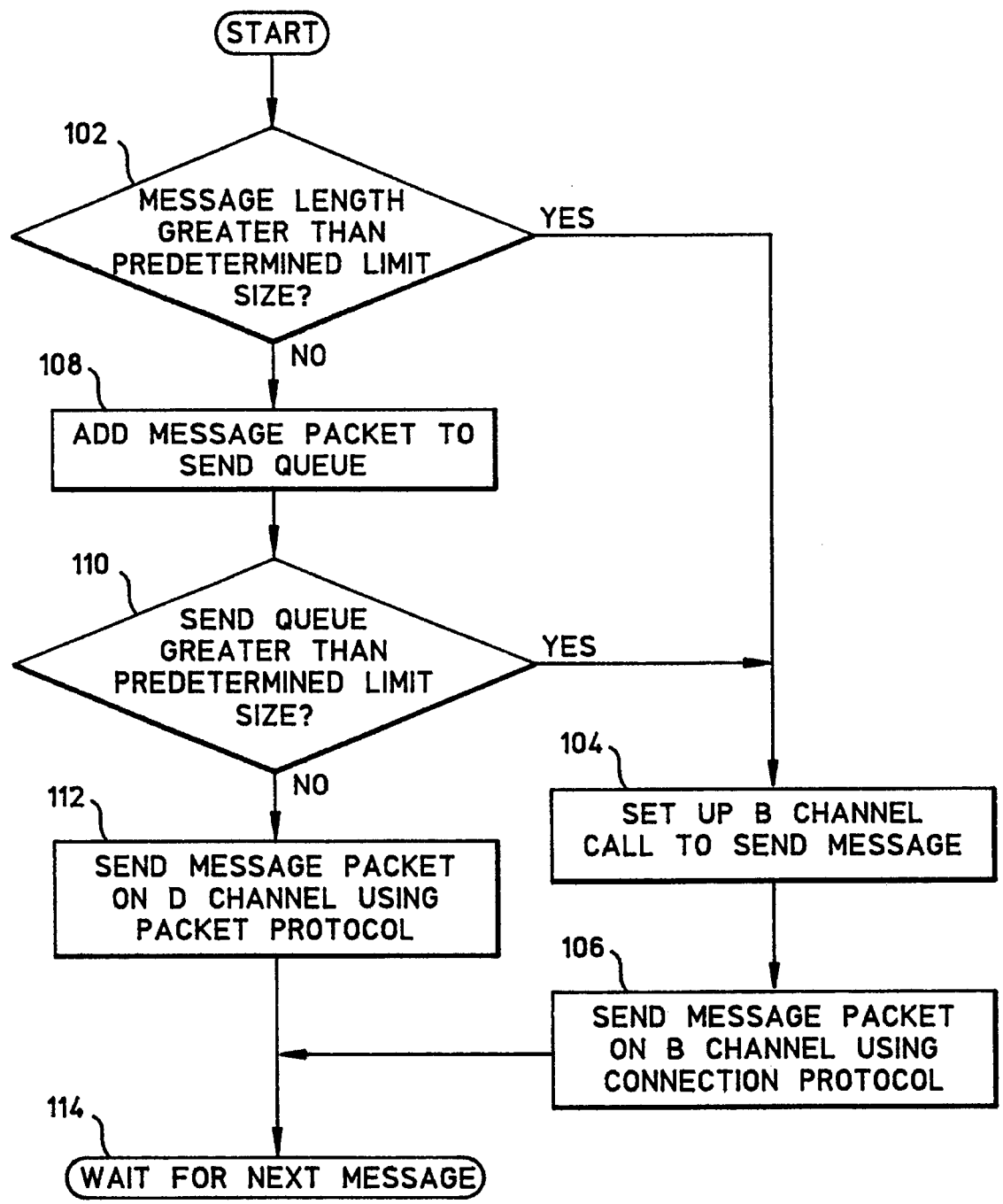
FIG. 3 is a flow diagram that illustrates the processing steps performed by the adapter device illustrated in FIG. 1.

The operation of the ISDN bridge 28 illustrated in FIG. 2 will be better understood with reference to the flow diagram of FIG. 3, which illustrates the processing steps performed in response to a data packet that is provided by the local user device 12 to the ISDN bridge 28 for sending over the communications network. When the central processor unit 56 of the ISDN bridge receives a data packet, it first determines whether the length of a message contained in the data packet is greater than a predetermined message limit size, as represented by the flow diagram box numbered 102. The data configuration for data packets and for messages that are compatible with data networks and with the ISDN specification are dependent on a particular site implementation and will be otherwise well-known by those skilled in the art without further explanation. The message limit size is predetermined in that it is not dynamically changed in the preferred embodiment during the processing of a received data packet. As noted above, however, the message limit size comprises an operating parameter that can be loaded into the program memory by means of an external computer device and generally can be subsequently changed.

If the data packet message size is greater than the message limit size, then the central processor unit sets up a call over the ISDN B channel to send the message, as represented by the flow diagram box numbered 104. An ISDN B channel call can be set up and connected in a relatively small amount of time, in fractions of a second. Those skilled in the art will readily understand the operations necessary to set up an ISDN call without further explanation. Next, the central processor unit causes the message packet to be sent over the B channel using the connection protocol of the ISDN standard. This message sending step is represented by the flow diagram box numbered 106. Those skilled in the art will readily understand the operations necessary to send a message packet over the ISDN B channel without further explanation.

When the data packet is initially received at the processing step represented by the decision box numbered 102, if the data packet message length is not greater than the predetermined message limit size, a negative outcome at the decision box, then the central processor unit adds the data packet to the send queue of the ISDN bridge, as represented by the flow diagram box numbered 108. Next, as represented by the decision box numbered 110, the central processor unit determines if the send queue has a sufficient number of messages in it such that the messages contained in the send queue have a total length greater than a predetermined send queue limit size. As with the message limit size, the send queue limit size is predetermined in that it is not dynamically changed during the processing of a received message, but can be loaded into the ISDN bridge memory (and subsequently changed) by means of an external computer device.

If the predetermined send queue limit size is exceeded by the actual send queue message length, then the processing follows the path through the flow diagram boxes numbered 104 and 106 for sending a message over the ISDN B channel. If the messages in the send queue do not have a total length that exceeds the predetermined send queue limit size, a negative outcome at the decision box numbered 110, then the central processor unit sends the received message packet on the ISDN D channel using the packet protocol of the ISDN standard. The operations necessary to send messages over the high-speed lines 24 are dependent upon the user implementation and otherwise are well-known by those skilled in the art without further explanation.

Those skilled in the art will readily appreciate that the ISDN B channel is used for most digital message traffic and can have a wide range of utilization rates, connect times, and message lengths, and that the ISDN D channel is primarily used for sending message packets for network signaling and therefore typically carries relatively short messages with minimal connect times. Those skilled in the art also will appreciate that, as a result of the different connect times, utilization rates, and message lengths between the two channels, ISDN B channel calls are typically charged according to the time during which there is an actual connection, at the standard business telephone line call rate for a voice call, and that ISDN D channel calls are typically charged at a flat monthly rate for access regardless of the number of calls connected. Thus, if the data messages received by the ISDN bridge are sufficiently short to be sent over the packetized ISDN D channel, then the ISDN bridge of the preferred embodiment permits the less expensive D channel to be used. In this way, lower telephone line charges can be expected for typical message traffic and the above-described problems such as those encountered with keep-alive messages and the like can be avoided or reduced. After the data packet message has been sent to the interface adapter device for transmission over the high speed communication lines, whether the ISDN B channel is used or the ISDN D channel is used, the last step in processing the data message is to wait for the next message that must be sent, as represented by the flow diagram box numbered 114.

The message limit size and send queue limit size for an ISDN bridge at a local site are selected in view of the particular message traffic expected at the local site, the configuration of the network, and the rate charges for the use of the high-speed communication lines. Those skilled in the art will be able to select values for the message limit size and send queue limit size that provide the desired level of cost control and operational performance, in view of the description above, without further explanation.

Thus, a communications network as described above includes an adapter device, such as an ISDN bridge device, that determines whether a message to be sent is sufficiently small so that it can be sent as a data packet over the out-of-band signaling, communications line for which a simple flat rate access charge must be paid, rather than over a dedicated line for which actual connect time is billed according to measured rate service. In this way, the cost of sending messages over the communications network is reduced.

The present invention has been described above in terms of a presently preferred embodiment so that an understanding of the present invention can be conveyed. There are, however, many configurations for message communication networks not specifically described herein but with which the present invention is applicable. The present invention should therefore not be seen as limited to the particular embodiment described herein, but rather, it should be understood that the present invention has wide applicability with respect to message communication networks generally. All modifications, variations, or equivalent arrangements that are within the scope of the attached claims should therefore be considered to be within the scope of the invention.

I claim:

1. An apparatus for receiving a digital data message from a local user connected to a communications network having multiple transmission channels and sending the data message to one or more remote users connected to the communications network, the apparatus comprising:

a local buffer memory in which the apparatus places the received data message;

a memory unit including a send queue in which data messages can be stored; and a processor that determines if the received data message has a length in bytes greater than a predetermined message limit size, selects a first one of the multiple transmission channels of the communications network to send the data message if the data message length was determined to be greater than the message limit size and otherwise places the received data message in a message packet temporarily stored in the send queue, whereupon the processor determines if the messages stored in the send queue have a total length greater than a predetermined queue limit size and selects the first one of the multiple transmission channels of the communications network to send the data messages stored in the send queue to the remote user if the send queue total data message length was determined to be greater than the queue limit size and otherwise selects a second one of the multiple transmission channels of the communications network to send the message packets in the send queue to the remote user if the send queue data message length was not greater than the queue limit size.

2. An apparatus as defined in claim 1, wherein the message limit size and the queue limit size are the same number of bytes.

3. An apparatus as defined in claim 1, wherein the communications network comprises a network that complies with the Integrated Services Data Network (ISDN) specification and the first one of the transmission channels comprises a first B channel of the ISDN communications network.

4. An apparatus as defined in claim 3, wherein the second one of the communications network transmission channels comprises a D channel of the ISDN communications network.

5. A method for sending a digital data message over a communications network having multiple transmission channels from a local user connected to the communications network to a remote user connected to the communications network, the method comprising the steps of:

determining if the data message has a length greater than a predetermined message limit size;

selecting a first one of the multiple transmission channels of the communications network to send the data message to the remote user if the data message length was determined to be greater than the message limit size and sending the data message over the selected transmission channel;

placing the data message in a message packet temporarily stored in a send queue;

determining if the messages stored in the send queue have a total length greater than a predetermined queue limit size;

selecting the first one of the multiple transmission channels of the communications network to send the data messages stored in the send queue to the remote user if the send queue total data message length was determined to be greater than the queue limit size and sending the data messages in the send queue over the selected transmission channel;

selecting a second one of the multiple transmission channels of the communications network to send the message packets in the send queue to the remote user if the send queue data message length was not greater than the queue limit size; and waiting for the next data message after sending the data message over the selected transmission channel.

6. A method as defined in claim 5, wherein the message limit size and the queue limit size are the same.

7. A method as defined in claim 5, wherein the communications network comprises a network that complies with the Integrated Services Data Network (ISDN) specification and the step of selecting a first one of the transmission channels comprises selecting a first B channel of the ISDN communications network.

8. A method as defined in claim 7, wherein the step of selecting a second one of the communications network transmission channels comprises selecting a D channel of the ISDN communications network.

9. A program storage device readable by a machine, tangibly embodying a program of instructions executable by the machine to perform method steps for sending a digital data message over a communications network having multiple transmission channels from a local user connected to the communications network to a remote user connected to the communications network, the method steps performed by the machine comprising:

determining if the data message has a length greater than a predetermined message limit size;

selecting a first one of the multiple transmission channels of the communications network to send the data message to the remote user if the data message length was determined to be greater than the message limit size and sending the data message over the selected transmission channel;

placing the data message in a message packet temporarily stored in a send queue;

determining if the messages stored in the send queue have a total length greater than a predetermined queue limit size;

selecting the first one of the multiple transmission channels of the communications network to send the data messages stored in the send queue to the remote user if the send queue total data message length was determined to be greater than the queue limit size and sending the data messages in the send queue over the selected transmission channel;

selecting a second one of the multiple transmission channels of the communications network to send the message packets in the send queue to the remote user if the send queue data message length was not greater than the queue limit size; and waiting for the next data message after sending the data message over the selected transmission channel.

10. A program storage device as defined in claim 9, wherein the message limit size and the queue limit size are the same.

11. A program storage device as defined in claim 9, wherein the communications network comprises a network that complies with the Integrated Services Data Network (ISDN) specification and the step of selecting a first one of the transmission channels comprises selecting a first B channel of the ISDN communications network.

12. A program storage device as defined in claim 11, wherein the step of selecting a second one of the communications network transmission channels comprises selecting a D channel of the ISDN communications network.

* * * * *